(12) United States Patent
Yasin et al.

(10) Patent No.: US 9,342,433 B2
(45) Date of Patent: May 17, 2016

(54) ELAPSED CYCLE TIMER IN LAST BRANCH RECORDS

(71) Applicant: Intel Corporation, Santa Clara, CA (US)

(72) Inventors: Ahmad Yasin, Haifa (IL); Michael W. Chynoweth, Rio Rancho, NM (US); Ofer Levy, Atlit (IL); Jason W. Brandt, Austin, TX (US); Angela Schmid, Pleasanton, CA (US)

(73) Assignee: Intel Corporation, Santa Clara, CA (US)

( * ) Notice: Subject to any disclaimer, the term of this patent is extended or adjusted under 35 U.S.C. 154(b) by 443 days.

(21) Appl. No.: 13/922,421

(22) Filed: Jun. 20, 2013

(65) Prior Publication Data

US 2014/0380027 A1     Dec. 25, 2014

(51) Int. Cl.
*G06F 9/30*     (2006.01)
*G06F 11/34*     (2006.01)

(52) U.S. Cl.
CPC .......... *G06F 11/348* (2013.01); *G06F 11/3419* (2013.01); *G06F 2201/865* (2013.01); *G06F 2201/88* (2013.01)

(58) Field of Classification Search
CPC ........................................................ G06F 9/30
See application file for complete search history.

(56) References Cited

U.S. PATENT DOCUMENTS 6,233,679 B1 * 5/2001 Holmberg ............... G06F 9/342
                                                                     712/240

\* cited by examiner

*Primary Examiner* — Cheng-Yuan Tseng
(74) *Attorney, Agent, or Firm* — Lowenstein Sandler LLP

(57) ABSTRACT

A processing device implementing an elapsed cycle timer in last branch records (LBRs) is disclosed. A processing device of the disclosure includes a last branch record (LBR) counter to iterate with each cycle of the processing device and an LBR structure communicably coupled to the LBR counter. The LBR structure comprises a plurality of LBR entries. Furthermore, an LBR entry of the plurality of LBR entries comprises an address instruction pointer (IP) of a branch instruction executed by the processing device, an address IP of a target of the branch instruction, and an elapsed time field that stores a value of the LBR counter when the LBR entry is created.

21 Claims, 10 Drawing Sheets

ELAPSED CYCLE TIMER IN LAST BRANCH RECORDS

TECHNICAL FIELD

The embodiments of the disclosure relate generally to processing devices and, more specifically, relate to an elapsed cycle timer in last branch records.

BACKGROUND

Performance analysis of software often relies on timing portions of code. Typically, instrumentation may be used to time code segments using methodologies that are intrusive, inaccurate, and cannot be used on granular portions of code. For example, the most common methodology is to add read-time-stamp (RSTSC) instructions before and after code segments with a serializing instruction such as CPUID. This is what many profilers feature today to time the execution times of functions. These solutions can impact workload run time of instrumented applications and the intrusiveness of the instrumentation often changes characteristics of the original application code.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
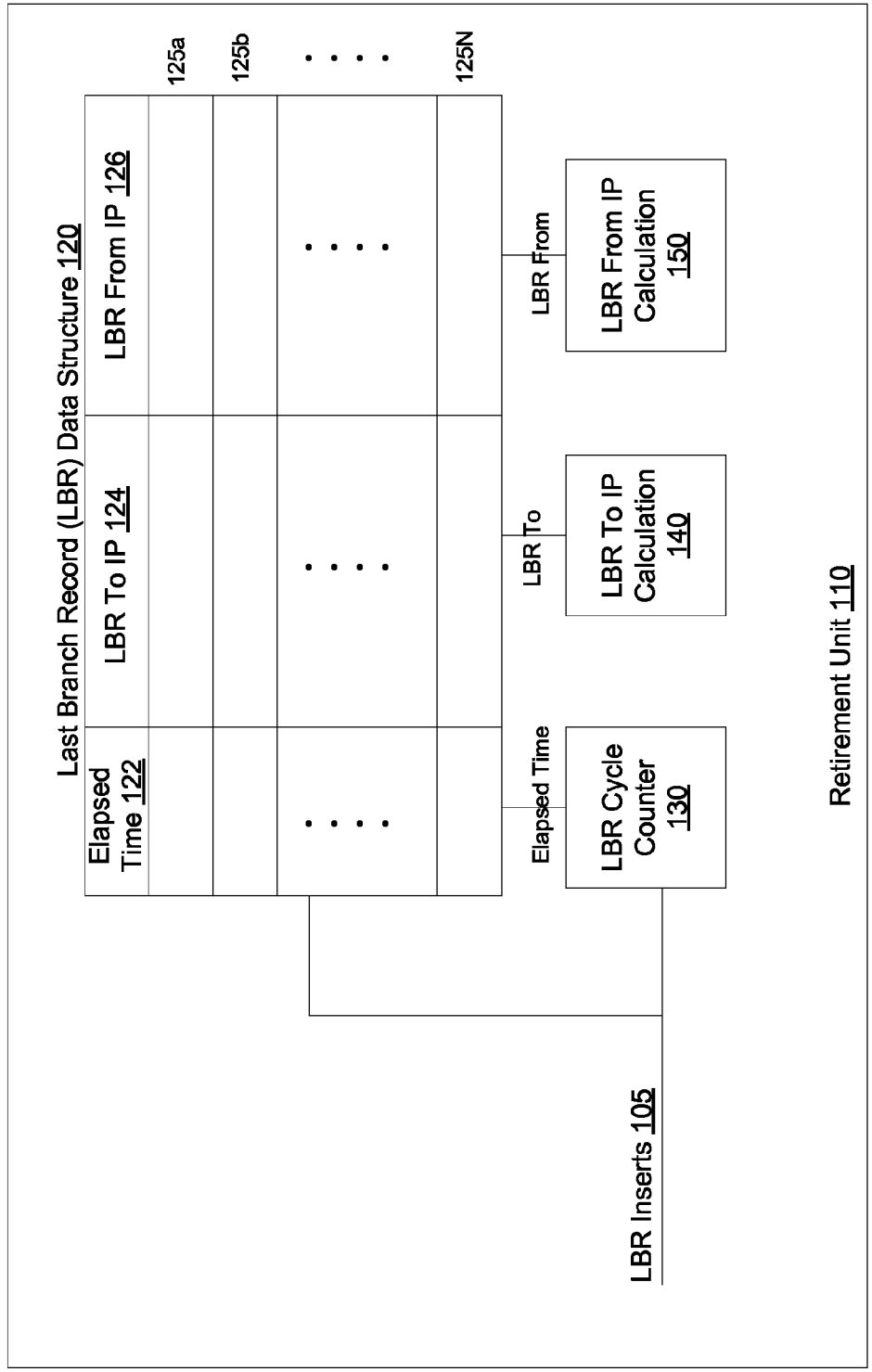
FIG. 1 illustrates an exemplary architecture in accordance with which implementations may operate, where the architecture is a processing device implementing an elapsed cycle time in last branch records (LBRs).

Embodiments of the disclosure implement techniques to provide an elapsed cycle timer in last branch records (LBRs). Implementations of the disclosure provide a hardware methodology to augment an existing performance monitoring capability, the LBRs. The LBR is a component of the processor that captures source and target addresses of taken branches of instructions executed by the processor. The LBR can capture every taken branch or have filters applied to capture special types of taken branches, such as calls, returns, far branches, and so on. Implementations allow the LBR to accurately collect and store cycle timing on portions of code between branch entries in the LBRs. A LBR cycle counter is introduced that measures a number of cycles, such as iterations (i.e., cycles) of a core clock of the processor or iterations (i.e., cycles) of a reference clock of the processor, occurring between creation of successive LBR entries. In addition, each LBR entry is extended to include a field for cycle counter information (e.g., elapsed time). Whenever conditions apply for creation of a new LBR entry in the LBR, the LBR cycle counter is sampled along with the LBR from/to instruction pointer (IP) addresses) to compose the LBR entry. The sampled LBR cycle counter value is stored in the cycle counter field of the LBR entry. The LBR cycle counter is then reset to count cycles until the next LBR entry is added to the LBR.

The cycle counter filed in the LBR improves current performance monitoring capabilities by reporting out segments of paths of execution (e.g., particular sequence of instructions executed by the processor for a program) along with timing of each segment. Previously, time stamp instructions were added before and after code segments to obtain timing information of code segments. This was a cumbersome and expensive (in terms of time and processor resources) procedure. In comparison, the timed LBRs of implementations of the disclosure now allow software to read the most recent LBR records to construct control-flow sequences (e.g., the order in which individual statements, instruction, function calls of a program are executed or evaluated) of an executed program leading to state of execution of the program. In addition to the architectural control flow of addresses, the exact time it took the processor to execute the segments of control flow is now available to software due to the new cycle counter information stored with each LBR entry. This results in accurate calculation of cycles per instruction (CPI) through static analysis for each sampled control flow, accurate timings of many types of code segments including functions, loop iterations, and system calls, and timing code portions where sampling may not apply due to interrupts being disabled (for example).

Although the following embodiments may be described with reference to specific integrated circuits, such as in computing platforms or microprocessors, other embodiments are applicable to other types of integrated circuits and logic devices. Similar techniques and teachings of embodiments described herein may be applied to other types of circuits or semiconductor devices. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below.

Although the following embodiments are described with reference to a processor, other embodiments are applicable to other types of integrated circuits and logic devices. Similar techniques and teachings of embodiments of the disclosure can be applied to other types of circuits or semiconductor devices that can benefit from higher pipeline throughput and improved performance. The teachings of embodiments of the disclosure are applicable to any processor or machine that performs data manipulations. However, the present disclosure is not limited to processors or machines that perform 512 bit, 256 bit, 128 bit, 64 bit, 32 bit, or 16 bit data operations and can be applied to any processor and machine in which manipulation or management of data is performed. In addition, the following description provides examples, and the accompanying drawings show various examples for the purposes of illustration. However, these examples should not be construed in a limiting sense as they are merely intended to provide examples of embodiments of the present disclosure rather than to provide an exhaustive list of all possible implementations of embodiments of the present disclosure.

As more computer systems are used in internet, text, and multimedia applications, additional processor support has been introduced over time. In one embodiment, an instruction set may be associated with one or more computer architectures, including data types, instructions, register architecture, addressing modes, memory architecture, interrupt and exception handling, and external input and output (I/O).

In one embodiment, the instruction set architecture (ISA) may be implemented by one or more micro-architectures, which includes processor logic and circuits used to implement one or more instruction sets. Accordingly, processors with different micro-architectures can share at least a portion of a common instruction set. For example, Intel® Pentium 4 processors, Intel® Core™ processors, and processors from Advanced Micro Devices, Inc. of Sunnyvale Calif. implement nearly identical versions of the x86 instruction set (with some extensions that have been added with newer versions), but have different internal designs. Similarly, processors designed by other processor development companies, such as ARM Holdings, Ltd., MIPS, or their licensees or adopters, may share at least a portion a common instruction set, but may include different processor designs. For example, the same register architecture of the ISA may be implemented in different ways in different micro-architectures using new or well-known techniques, including dedicated physical registers, one or more dynamically allocated physical registers using a register renaming mechanism (e.g., the use of a Register Alias Table (RAT), a Reorder Buffer (ROB) and a retirement register file. In one embodiment, registers may include one or more registers, register architectures, register files, or other register sets that may or may not be addressable by a software programmer.

In one embodiment, an instruction may include one or more instruction formats. In one embodiment, an instruction format may indicate various fields (number of bits, location of bits, etc.) to specify, among other things, the operation to be performed and the operand(s) on which that operation is to be performed. Some instruction formats may be further broken defined by instruction templates (or sub formats). For example, the instruction templates of a given instruction format may be defined to have different subsets of the instruction format's fields and/or defined to have a given field interpreted differently. In one embodiment, an instruction is expressed using an instruction format (and, if defined, in a given one of the instruction templates of that instruction format) and specifies or indicates the operation and the operands upon which the operation will operate.

FIG. 1 illustrates an exemplary architecture 100 in accordance with which implementations may operate, where the architecture 100 is a processing device (e.g., processor and/or CPU) implementing an elapsed cycle time in last branch records (LBRs). Architecture 100 may include a retirement unit 110. Retirement unit 110 receives the results of executed micro-operations (uops) of an application from an execution core (not shown) of the processor, and processes these results so that an architectural state is updated according to an original program order of the application. The retirement unit 110 may also keep track of branches and branch target information based on the executed uop results it receives.

Retirement unit may also include a LBR data structure 120. The size and location of the LBR data structure 120 can vary and may be processor architecture-specific. When an LBR debug feature of the processor 100 is set, a running trace of most recent branches taken by the processors may be recorder in the LBR data structure 120. When a branch is taken by the processor, a LBR insert signal 105 is sent to the LBR data structure 120 to cause a new LBR entry 125a-N to be generated in the LBR data structure 120. The LBR insert signal 105 may take into account possible LBR-filtered configuration. For example, when the LBR is configured to file CALL branches, the LBR insert signal 105 is sent when CALL branches are encountered and not sent upon occurrence of any other types of branches.

In one implementation, the LBR data structure 120 may include multiple model-specific registers (MSRs) that store source and destination instruction pointer (IP) addresses of recent branches. When the LBR insert signal 105 is received, the data from an LBR To IP calculation 140 and an LBR From IP calculation 150 are copied into an LBR To IP field 124 and an LBR From IP field 126 of the new LBR data structure 120 entry 125a-N. The LBR To field 124 and the LBR From field 126 may each be registers of the LBR data structure 120.

In addition, in implementations of the disclosure, each LBR entry 125A-N may be augmented with an elapsed time field 122. The elapsed time field 122 is an n-bit field that represents a count of cycles elapsed since a last LBR entry 125a-N was inserted into the LBR data structure 120. In one implementation, the cycles are core clock cycles of the processor. In other implementations, the cycles are reference clock cycles of the processor. The width (e.g., n bits) of the field is dependent on the architectural design of the processor 100. In one implementation, the elapsed time field 122 may be 16 bits. However, implementations of the disclosure may encompass any number of bits. The size of the elapsed time field 122 dictates a number of cycles that the elapsed time field 122 saturates. For example, if the elapsed time field is 16 bits, the field 122 saturates at approximately 65,536 cycles (e.g., 2^16). However, saturation may be a rare occurrence as branches are frequently encountered. However, if extensive branch filters are being applied to the LBR, then saturation may occur. In some implementations, resolution of the elapsed time may be adjusted to account for this saturation threshold. For example, the LBR clock counter 130 may increment at every 1,000 core clock cycles, and so on.

The elapsed time field 122 may be part of a last branch info register, which along with the LBR To field 124 register and LBR From field 126 register, compose an enhanced LBR entry 125a-N according to implementations of the disclosure. The last branch info register may contain miscellaneous information related to the actual branch execution, such as the elapsed time, whether the branch mispredicted, and so on.

The elapsed time field 122 data may be obtained from an LBR cycle counter 130. The LBR cycle counter 130 may track the cycles (e.g., core clock cycles or reference clock cycles) of the processor 100. For example, the LBR cycle counter 130 may increment in time with each increment of the core clock of the processor 100. When the LBR insert signal 105 is received at the LBR data structure 120, the current value from the LBR cycle counter 130 is sampled and stored into the elapsed time field 122 of the new LBR entry 125a-N that is being created. In addition, the LBR cycle counter 130 is reset. This reset allows cycles to be counted relative to a last LBR entry. (e.g., between two subsequent LBR entry 125a-N insertions), thereby accounting for the timing of the next LBR entry 125a-N.

In some implementation, after a new LBR entry 125a-N is created, a top-of-stack register (not shown) for the LBR data structure 120 is updated to point to the newest entry 125a-N in the LBR data structure 120.

Figure 2:
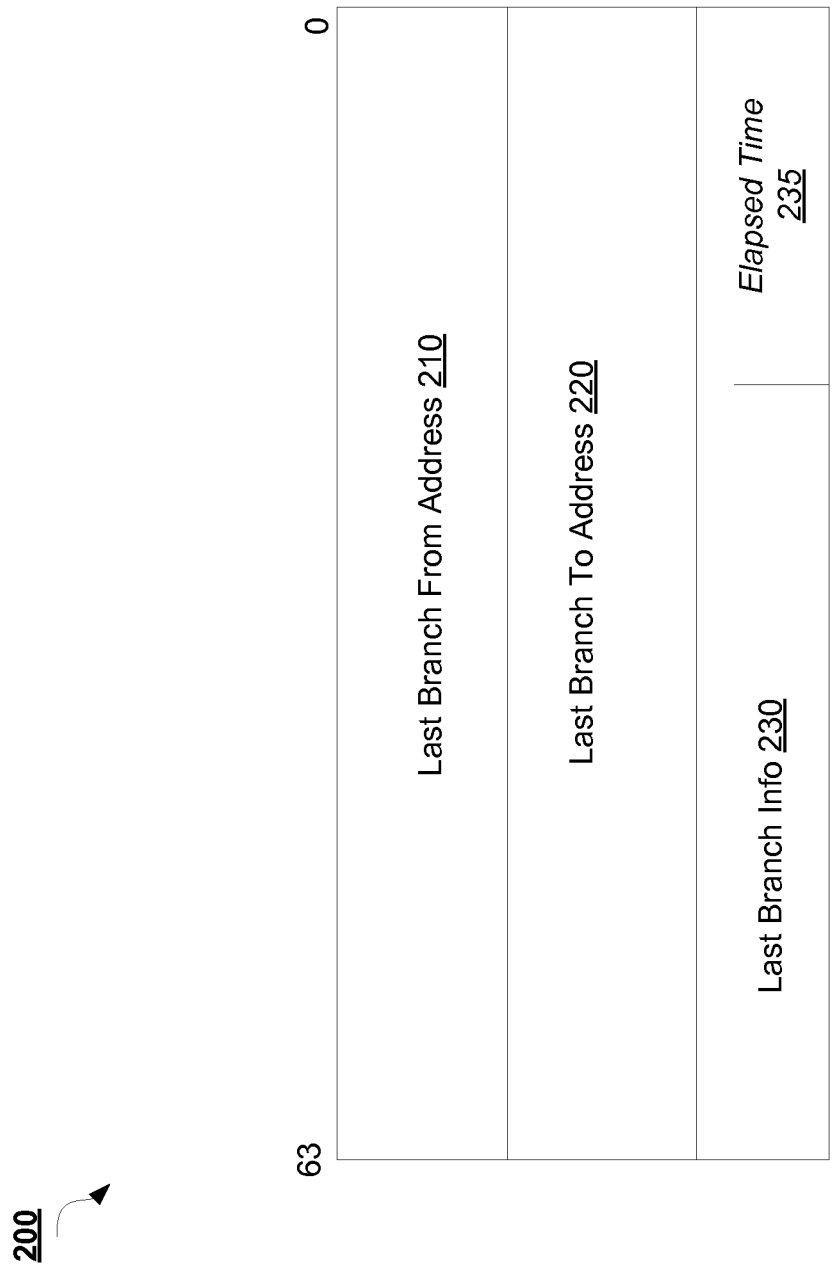
FIG. 2 is a block diagram illustrating an example LBR entry that tracks elapsed cycle time between taken branches in accordance with which implementations may operate.

FIG. 2 is a block diagram illustrating an example LBR entry 200 that tracks elapsed cycle time between taken branches in accordance with which implementations may operate. A processor may track elapsed time (e.g., core clock cycles, reference clock cycles) between two subsequent taken branches and store that information as part of the LBR entry 200. In one implementation, LBR entry 200 is the same as LBR entries 125a-N described with respect to FIG. 1.

LBR entry 200 may be composed of multiple registers, such as MSRs of a processor. The LBR entry 200 may include a last branch from address 210, a last branch to address 220, and a last branch info 230. As shown, each of the last branch from address 210, last branch to address 220, and last branch info 230 are 64-bit registers that together compose the LBR entry 200. However, other register sizes and formats may also be utilized in implementations of the disclosure.

The last branch from address 210 may include the address (IP) of the branch instruction. The last branch to address 220 may include the address (IP) of the target branch instruction. In some implementation, the address of the branch instruction and target branch instruction may be a linear address. In other implementations, the address may be any other type of non-linear address. The last branch info 230 may include miscellaneous information related to the actual branch execution. For example, the last branch info may include an elapsed time field 235 that represents a count of the core clocks elapsed since a last LBR entry was inserted into the LBR. The elapsed time field may be the same as elapsed time field 122 described with respect to FIG. 1. The last branch info may also contain information, such as whether the branch mispredicted, and so on.

Figure 3:
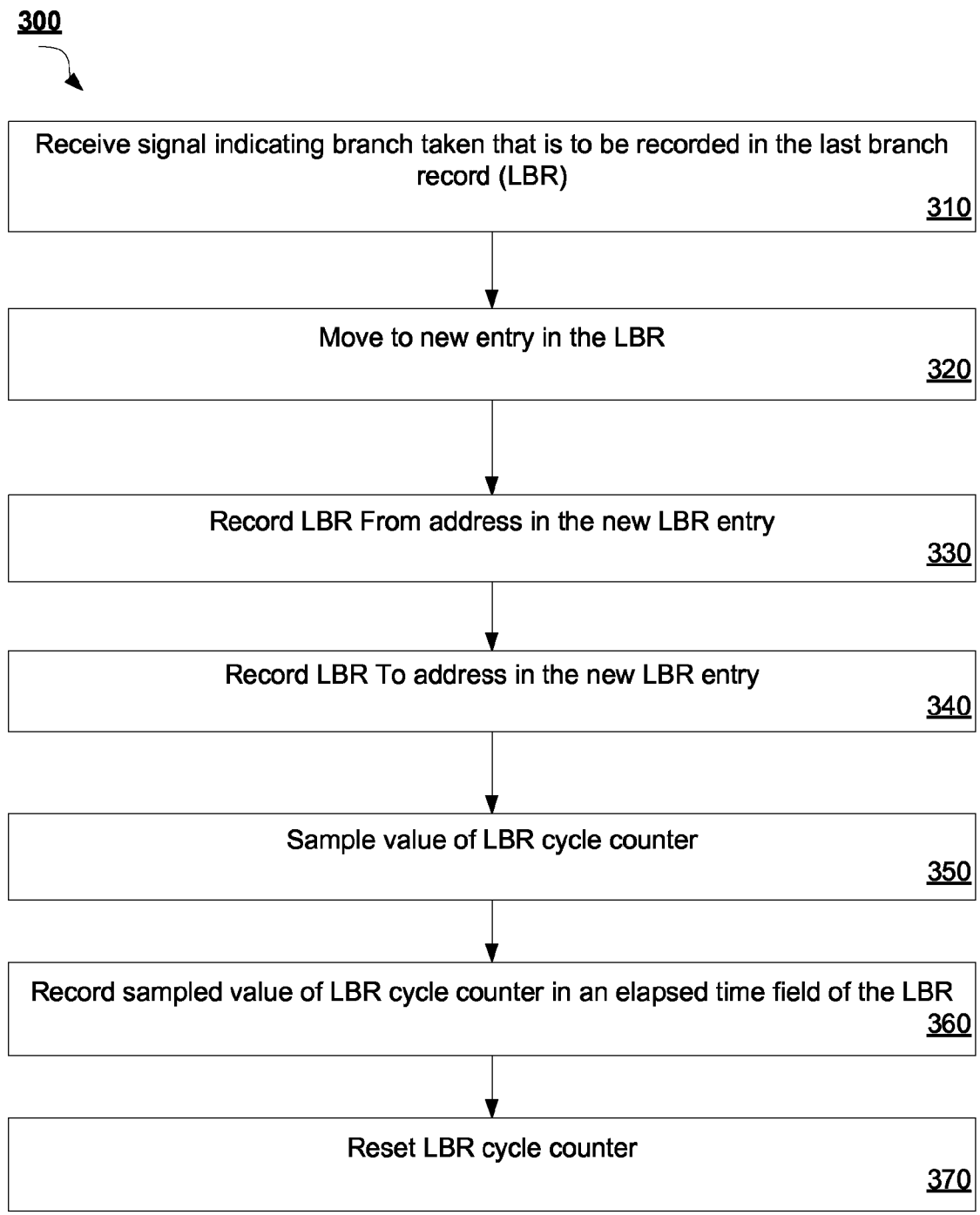
FIG. 3 is a flow diagram illustrating another method 300 for tracking elapsed cycle time in LBRs according to an implementation of the disclosure.

FIG. 3 is a flow diagram illustrating another method 300 for tracking elapsed cycle time in LBRs according to an implementation of the disclosure. Method 300 may be performed by processing logic that may comprise hardware (e.g., circuitry, dedicated logic, programmable logic, microcode, etc.), software (such as instructions run on a processing device), firmware, or a combination thereof. In one embodiment, method 300 is performed by LBR data structure 120 of FIG. 1.

Method 300 begins at block 310 where a signal is received indicating a branch was taken that is to be recorded in the LBR. In one implementation, the signal may originate from componentry of a retirement unit of a processor, where the retirement unit receives results from executed uops, including information regarding taken branches. At block 320, a new entry in the LBR is accessed. In one embodiment, the LBR is an array structure, and the new entry is accessed with reference to a top-of-stack pointer associated with the array.

At block 330, an LBR From address is recorded in the new LBR entry. In one implementation, the LBR From address is an address of the taken branch instruction. The LBR From address may be obtained from an LBR From calculation component of the retirement unit. Similarly, at block 340, an LBR To address is recorded in the new LBR entry. The LBR To address is an address of a target of the branch instruction. The LBR To address may be obtained from an LBR To calculation component of the retirement unit.

Subsequently, at block 350, a value of an LBR cycle counter is sampled. The LBR cycle counter may track the cycles (e.g., core clock cycles, reference clock cycles, etc.) of the processor. For example, the LBR cycle counter may increment in time with each increment of the core clock of the processor. At block 360, the sampled value of the LBR cycle counter is recorded in an elapsed time field of the LBR entry. In one implementation, the elapsed time field is part of a last branch info register of the LBR entry. Lastly, at block 370, the LBR cycle counter is reset to track elapsed time until the next LBR entry is inserted into the LBR.

Figure 4A:
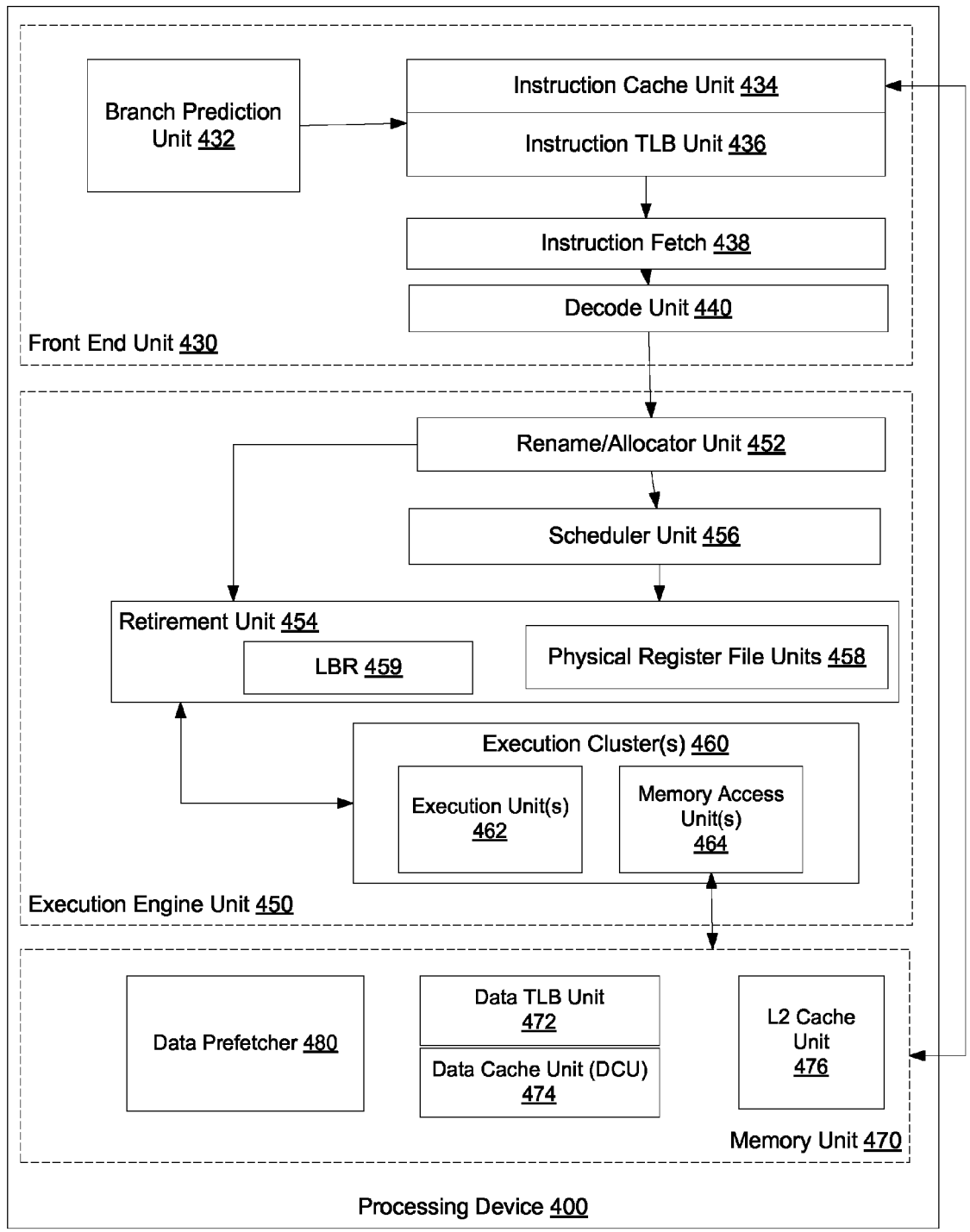
FIG. 4A is a block diagram illustrating a micro-architecture for a processor that implements elapsed cycle time in LBRs in which one embodiment of the disclosure may be used.

FIG. 4A is a block diagram illustrating a micro-architecture for a processor 400 that implements tracking elapsed cycle time in LBRs in accordance with one embodiment of the disclosure. Specifically, processor 400 depicts an in-order architecture core and a register renaming logic, out-of-order issue/execution logic to be included in a processor according to at least one embodiment of the disclosure.

Processor 400 includes a front end unit 430 coupled to an execution engine unit 450, and both are coupled to a memory unit 470. The processor 400 may include a reduced instruction set computing (RISC) core, a complex instruction set computing (CISC) core, a very long instruction word (VLIW) core, or a hybrid or alternative core type. As yet another option, processor 400 may include a special-purpose core, such as, for example, a network or communication core, compression engine, graphics core, or the like. In one embodiment, processor 400 may be a multi-core processor or may part of a multi-processor system.

The front end unit 430 includes a branch prediction unit 432 coupled to an instruction cache unit 434, which is coupled to an instruction translation lookaside buffer (TLB) 436, which is coupled to an instruction fetch unit 438, which is coupled to a decode unit 440. The decode unit 440 (also known as a decoder) may decode instructions, and generate as an output one or more micro-operations, micro-code entry points, microinstructions, other instructions, or other control signals, which are decoded from, or which otherwise reflect, or are derived from, the original instructions. The decoder 440 may be implemented using various different mechanisms. Examples of suitable mechanisms include, but are not limited to, look-up tables, hardware implementations, programmable logic arrays (PLAs), microcode read only memories (ROMs), etc. The instruction cache unit 434 is further coupled to the memory unit 470. The decode unit 440 is coupled to a rename/allocator unit 452 in the execution engine unit 450.

The execution engine unit 450 includes the rename/allocator unit 452 coupled to a retirement unit 454 and a set of one or more scheduler unit(s) 456. The scheduler unit(s) 456 represents any number of different schedulers, including reservations stations (RS), central instruction window, etc. The scheduler unit(s) 456 is coupled to the physical register file(s) unit(s) 458. Each of the physical register file(s) units 458 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 458 is overlapped by the retirement unit 454 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.).

In one embodiment, the retirement unit 454 includes an LBR 459 component to track elapsed cycle time between taken branches recorded in the LBR 459. LBR 459 may be the same as LBR 120 described with respect to FIG. 1.

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 454 and the physical register file(s) unit(s) 458 are coupled to the execution cluster(s) 460. The execution cluster(s) 460 includes a set of one or more execution units 462 and a set of one or more memory access units 464. The execution units 462 may perform various operations (e.g., shifts, addition, subtraction, multiplication) and operate on various types of data (e.g., scalar floating point, packed integer, packed floating point, vector integer, vector floating point).

While some embodiments may include a number of execution units dedicated to specific functions or sets of functions, other embodiments may include only one execution unit or multiple execution units that all perform all functions. The scheduler unit(s) 456, physical register file(s) unit(s) 458, and execution cluster(s) 460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 464). It should also be understood that where separate pipelines are used, one or more of these pipelines may be out-of-order issue/execution and the rest in-order.

The set of memory access units 464 is coupled to the memory unit 470, which may include a data prefetcher 480, a data TLB unit 472, a data cache unit (DCU) 474, and a level 2 (L2) cache unit 476, to name a few examples. In some embodiments DCU 474 is also known as a first level data cache (L1 cache). The DCU 474 may handle multiple outstanding cache misses and continue to service incoming stores and loads. It also supports maintaining cache coherency. The data TLB unit 472 is a cache used to improve virtual address translation speed by mapping virtual and physical address spaces. In one exemplary embodiment, the memory access units 464 may include a load unit, a store address unit, and a store data unit, each of which is coupled to the data TLB unit 472 in the memory unit 470. The L2 cache unit 476 may be coupled to one or more other levels of cache and eventually to a main memory.

In one embodiment, the data prefetcher 480 speculatively loads/prefetches data to the DCU 474 by automatically predicting which data a program is about to consume. Prefetching may refer to transferring data stored in one memory location of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

The processor 400 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 4B:
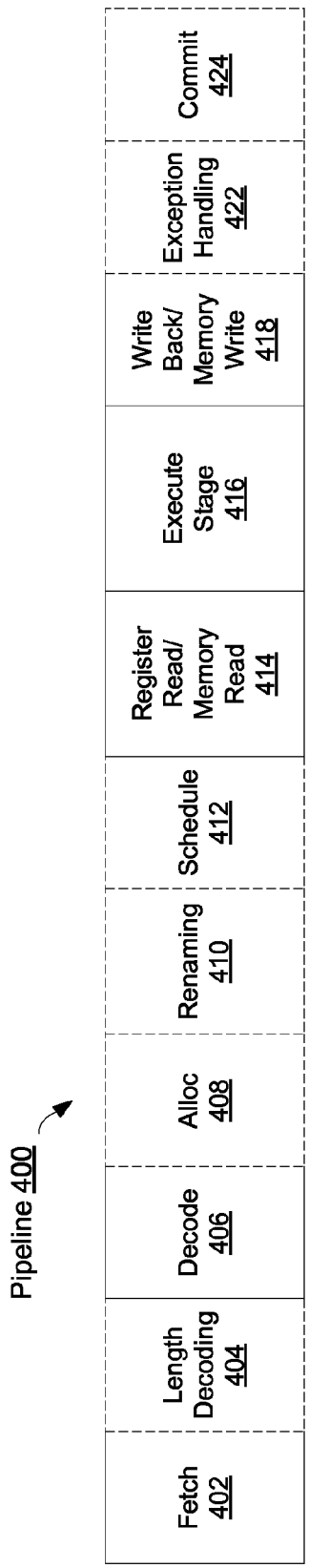
FIG. 4B is a block diagram illustrating an in-order pipeline and a register renaming stage, out-of-order issue/execution pipeline implemented according to at least one embodiment of the disclosure.

FIG. 4B is a block diagram illustrating an in-order pipeline and a register renaming stage, out-of-order issue/execution pipeline implemented by processing device 400 of FIG. 4A according to some embodiments of the disclosure. The solid lined boxes in FIG. 4B illustrate an in-order pipeline, while the dashed lined boxes illustrates a register renaming, out-of-order issue/execution pipeline. In FIG. 4B, a processor pipeline 400 includes a fetch stage 402, a length decode stage 404, a decode stage 406, an allocation stage 408, a renaming stage 410, a scheduling (also known as a dispatch or issue) stage 412, a register read/memory read stage 414, an execute stage 416, a write back/memory write stage 418, an exception handling stage 422, and a commit stage 424. In some embodiments, the ordering of stages 402-424 may be different than illustrated and are not limited to the specific ordering shown in FIG. 4B.

Figure 5:
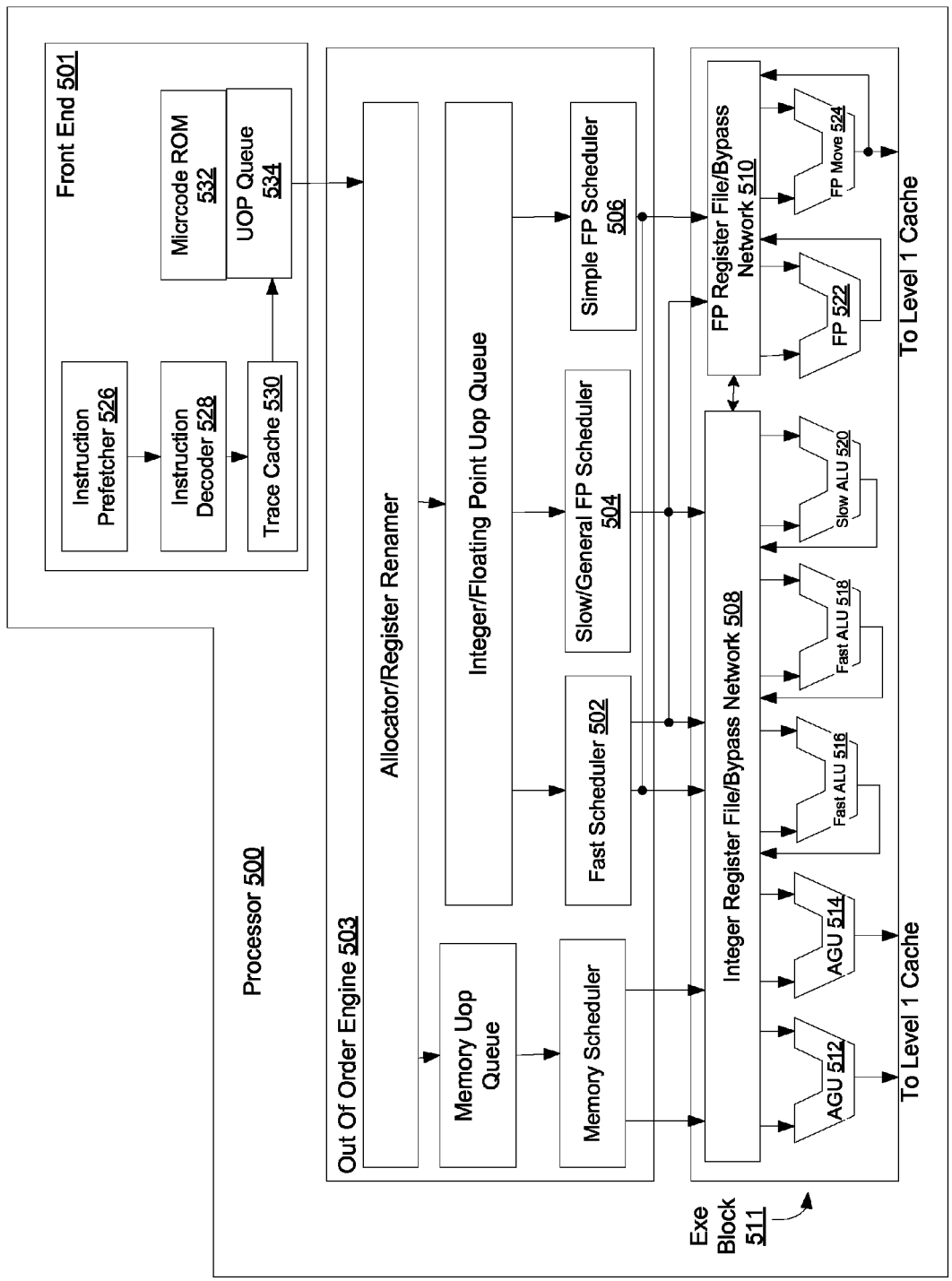
FIG. 5 illustrates a block diagram of the micro-architecture for a processor that includes logic circuits to perform tracking elapsed cycle time in LBRs in accordance with one embodiment of the disclosure.

FIG. 5 illustrates a block diagram of the micro-architecture for a processor 500 that includes logic circuits to track elapsed cycle time in LBRs in accordance with one embodiment of the disclosure. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 501 is the part of the processor 500 that fetches instructions to be executed and prepares them to be used later in the processor pipeline.

The front end 501 may include several units. In one embodiment, the instruction prefetcher 526 fetches instructions from memory and feeds them to an instruction decoder 528 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 530 takes decoded uops and assembles them into program ordered sequences or traces in the uop queue 534 for execution. When the trace cache 530 encounters a complex instruction, the microcode ROM 532 provides the uops needed to complete the operation.

Some instructions are converted into a single micro-op, whereas others need several micro-ops to complete the full operation. In one embodiment, if more than four micro-ops are needed to complete an instruction, the decoder 528 accesses the microcode ROM 532 to do the instruction. For one embodiment, an instruction can be decoded into a small number of micro ops for processing at the instruction decoder 528. In another embodiment, an instruction can be stored within the microcode ROM 532 should a number of micro-ops be needed to accomplish the operation. The trace cache 530 refers to an entry point programmable logic array (PLA) to determine a correct micro-instruction pointer for reading the micro-code sequences to complete one or more instructions in accordance with one embodiment from the micro-code ROM 532. After the microcode ROM 532 finishes sequencing micro-ops for an instruction, the front end 501 of the machine resumes fetching micro-ops from the trace cache 530.

The out-of-order execution engine 503 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 502, slow/general floating point scheduler 504, and simple floating point scheduler 506. The uop schedulers 502, 504, 506, determine when a uop is ready to execute based on the readiness of their dependent input register operand sources and the availability of the execution resources the uops need to complete their operation. The fast scheduler 502 of one embodiment can schedule on each half of the main clock cycle while the other schedulers can only schedule once per main processor clock cycle. The schedulers arbitrate for the dispatch ports to schedule uops for execution.

Register files 508, 510, sit between the schedulers 502, 504, 506, and the execution units 512, 514, 516, 518, 520, 522, 524 in the execution block 511. There is a separate register file 508, 510, for integer and floating point operations, respectively. Each register file 508, 510, of one embodiment also includes a bypass network that can bypass or forward just completed results that have not yet been written into the register file to new dependent uops. The integer register file 508 and the floating point register file 510 are also capable of communicating data with the other. For one embodiment, the integer register file 508 is split into two separate register files, one register file for the low order 32 bits of data and a second register file for the high order 32 bits of data. The floating point register file 510 of one embodiment has 128 bit wide entries because floating point instructions typically have operands from 64 to 128 bits in width.

The execution block 511 contains the execution units 512, 514, 516, 518, 520, 522, 524, where the instructions are actually executed. This section includes the register files 508, 510, that store the integer and floating point data operand values that the micro-instructions need to execute. The processor 500 of one embodiment is comprised of a number of execution units: address generation unit (AGU) 512, AGU 514, fast ALU 516, fast ALU 518, slow ALU 520, floating point ALU 522, floating point move unit 524. For one embodiment, the floating point execution blocks 522, 524, execute floating point, MMX, SIMD, and SSE, or other operations. The floating point ALU 522 of one embodiment includes a 64 bit by 64 bit floating point divider to execute divide, square root, and remainder micro-ops. For embodiments of the present disclosure, instructions involving a floating point value may be handled with the floating point hardware.

In one embodiment, the ALU operations go to the high-speed ALU execution units 516, 518. The fast ALUs 516, 518, of one embodiment can execute fast operations with an effective latency of half a clock cycle. For one embodiment, most complex integer operations go to the slow ALU 520 as the slow ALU 520 includes integer execution hardware for long latency type of operations, such as a multiplier, shifts, flag logic, and branch processing. Memory load/store operations are executed by the AGUs 512, 514. For one embodiment, the integer ALUs 516, 518, 520, are described in the context of performing integer operations on 64 bit data operands. In alternative embodiments, the ALUs 516, 518, 520, can be implemented to support a variety of data bits including 16, 32, 128, 256, etc. Similarly, the floating point units 522, 524, can be implemented to support a range of operands having bits of various widths. For one embodiment, the floating point units 522, 524, can operate on 128 bits wide packed data operands in conjunction with SIMD and multimedia instructions.

In one embodiment, the uops schedulers 502, 504, 506, dispatch dependent operations before the parent load has finished executing. As uops are speculatively scheduled and executed in processor 500, the processor 500 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The processor 500 also includes logic to implement tracking elapsed cycle time in LBRs according to embodiments of the disclosure. In one embodiment, the out or order engine 503 of processor 500 may include an LBR (not shown) for tracing branch instructions taken and tracking elapsed cycle time between subsequent tracked branch instructions.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data.

For the discussions below, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 6:
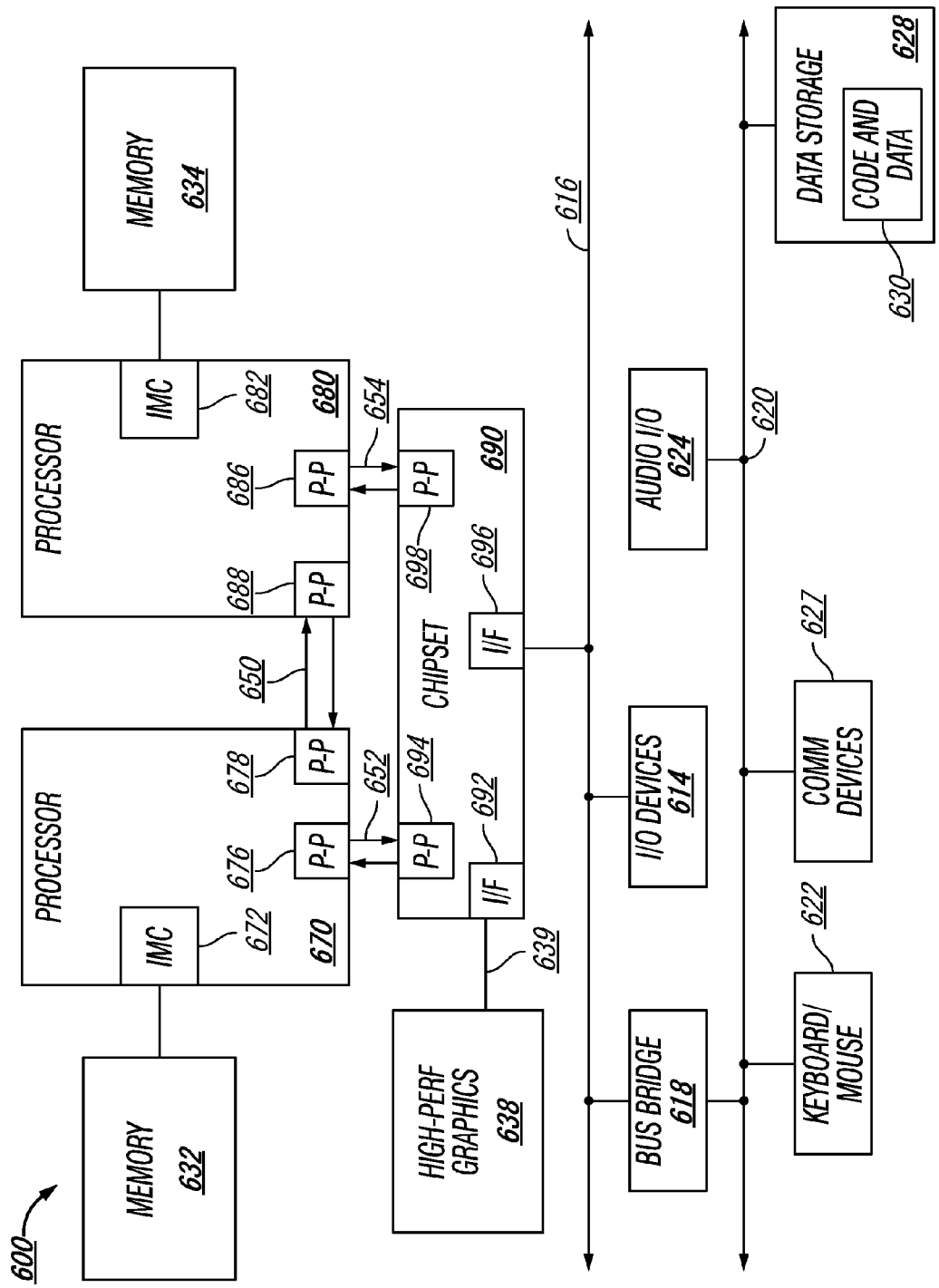
FIG. 6 is a block diagram illustrating a system in which an embodiment of the disclosure may be used.

Referring now to FIG. 6, shown is a block diagram illustrating a system 600 in which an embodiment of the disclosure may be used. As shown in FIG. 6, multiprocessor system 600 is a point-to-point interconnect system, and includes a first processor 670 and a second processor 680 coupled via a point-to-point interconnect 650. While shown with only two processors 670, 680, it is to be understood that the scope of embodiments of the disclosure is not so limited. In other embodiments, one or more additional processors may be present in a given processor. In one embodiment, the multiprocessor system 600 may implement tracking elapsed cycle time in LBRs as described herein.

Processors 670 and 680 are shown including integrated memory controller units 672 and 682, respectively. Processor 670 also includes as part of its bus controller units point-to-point (P-P) interfaces 676 and 678; similarly, second processor 680 includes P-P interfaces 686 and 688. Processors 670, 680 may exchange information via a point-to-point (P-P) interface 650 using P-P interface circuits 678, 688. As shown in FIG. 6, IMCs 672 and 682 couple the processors to respective memories, namely a memory 632 and a memory 634, which may be portions of main memory locally attached to the respective processors.

Processors 670, 680 may each exchange information with a chipset 690 via individual P-P interfaces 652, 654 using point to point interface circuits 676, 694, 686, 698. Chipset 690 may also exchange information with a high-performance graphics circuit 638 via a high-performance graphics interface 639.

A shared cache (not shown) may be included in either processor or outside of both processors, yet connected with the processors via P-P interconnect, such that either or both processors' local cache information may be stored in the shared cache if a processor is placed into a low power mode.

Chipset 690 may be coupled to a first bus 616 via an interface 696. In one embodiment, first bus 616 may be a Peripheral Component Interconnect (PCI) bus, or a bus such as a PCI Express bus or another third generation I/O interconnect bus, although the scope of the present disclosure is not so limited.

As shown in FIG. 6, various I/O devices 614 may be coupled to first bus 616, along with a bus bridge 618 which couples first bus 616 to a second bus 620. In one embodiment, second bus 620 may be a low pin count (LPC) bus. Various devices may be coupled to second bus 620 including, for example, a keyboard and/or mouse 622, communication devices 627 and a storage unit 628 such as a disk drive or other mass storage device which may include instructions/code and data 630, in one embodiment. Further, an audio I/O 624 may be coupled to second bus 620. Note that other architectures are possible. For example, instead of the point-to-point architecture of FIG. 6, a system may implement a multi-drop bus or other such architecture.

Figure 7:
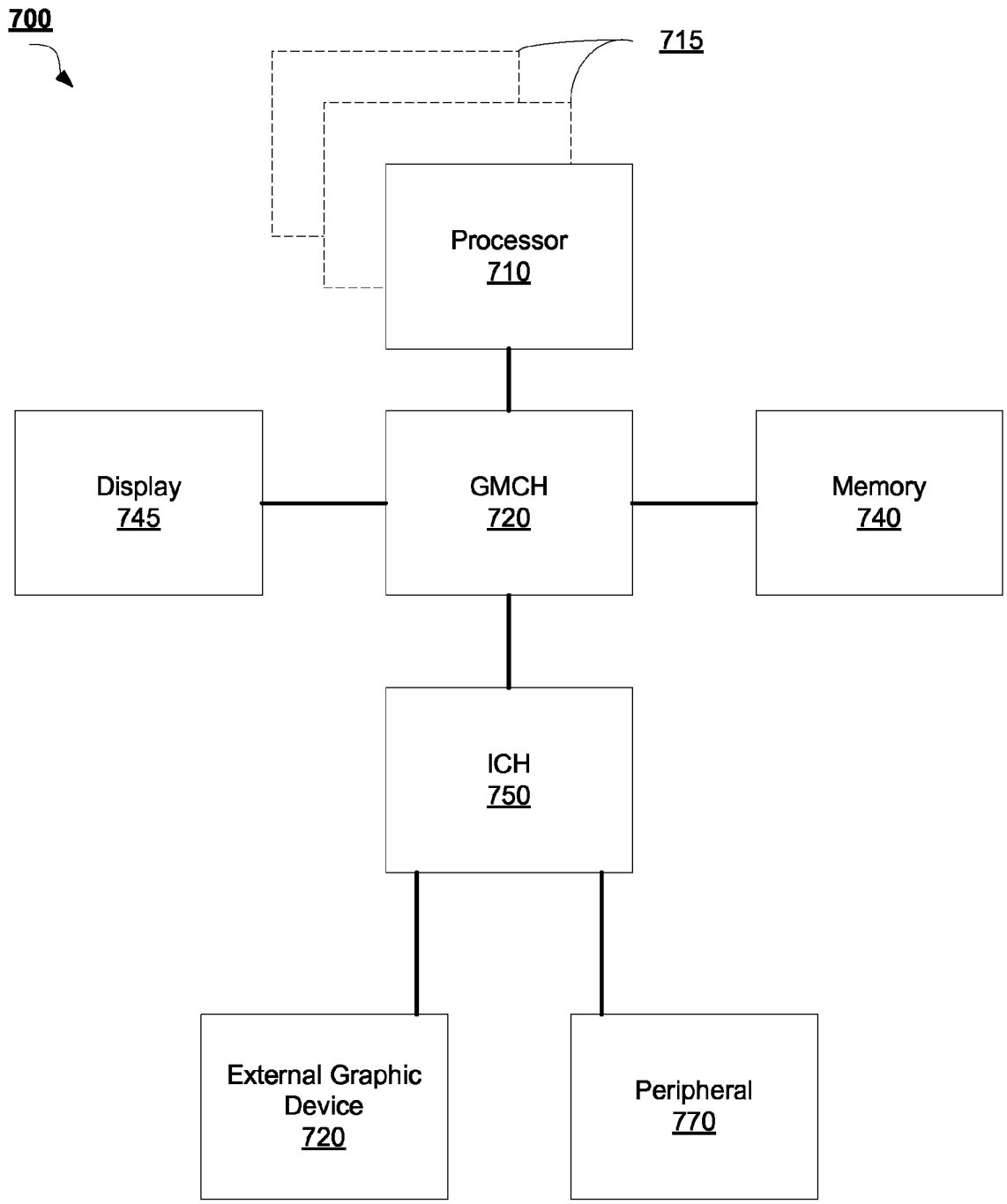
FIG. 7 is a block diagram of a system in which an embodiment of the disclosure may operate.

Referring now to FIG. 7, shown is a block diagram of a system 700 in which one embodiment of the disclosure may operate. The system 700 may include one or more processors 710, 715, which are coupled to graphics memory controller hub (GMCH) 720. The optional nature of additional processors 715 is denoted in FIG. 7 with broken lines. In one embodiment, processors 710, 715 implement tracking elapsed cycle time in LBRs according to embodiments of the disclosure.

Each processor 710, 715 may be some version of the circuit, integrated circuit, processor, and/or silicon integrated circuit as described above. However, it should be noted that it is unlikely that integrated graphics logic and integrated memory control units would exist in the processors 710, 715. FIG. 7 illustrates that the GMCH 720 may be coupled to a memory 740 that may be, for example, a dynamic random access memory (DRAM). The DRAM may, for at least one embodiment, be associated with a non-volatile cache.

The GMCH 720 may be a chipset, or a portion of a chipset. The GMCH 720 may communicate with the processor(s) 710, 715 and control interaction between the processor(s) 710, 715 and memory 740. The GMCH 720 may also act as an accelerated bus interface between the processor(s) 710, 715 and other elements of the system 700. For at least one embodiment, the GMCH 720 communicates with the processor(s) 710, 715 via a multi-drop bus, such as a frontside bus (FSB) 795.

Furthermore, GMCH 720 is coupled to a display 745 (such as a flat panel or touchscreen display). GMCH 720 may include an integrated graphics accelerator. GMCH 720 is further coupled to an input/output (I/O) controller hub (ICH) 750, which may be used to couple various peripheral devices to system 700. Shown for example in the embodiment of FIG. 7 is an external graphics device 760, which may be a discrete graphics device, coupled to ICH 750, along with another peripheral device 770.

Alternatively, additional or different processors may also be present in the system 700. For example, additional processor(s) 715 may include additional processors(s) that are the same as processor 710, additional processor(s) that are heterogeneous or asymmetric to processor 710, accelerators (such as, e.g., graphics accelerators or digital signal processing (DSP) units), field programmable gate arrays, or any other processor. There can be a variety of differences between the processor(s) 710, 715 in terms of a spectrum of metrics of merit including architectural, micro-architectural, thermal, power consumption characteristics, and the like. These differences may effectively manifest themselves as asymmetry and heterogeneity amongst the processors 710, 715. For at least one embodiment, the various processors 710, 715 may reside in the same die package.

Figure 8:
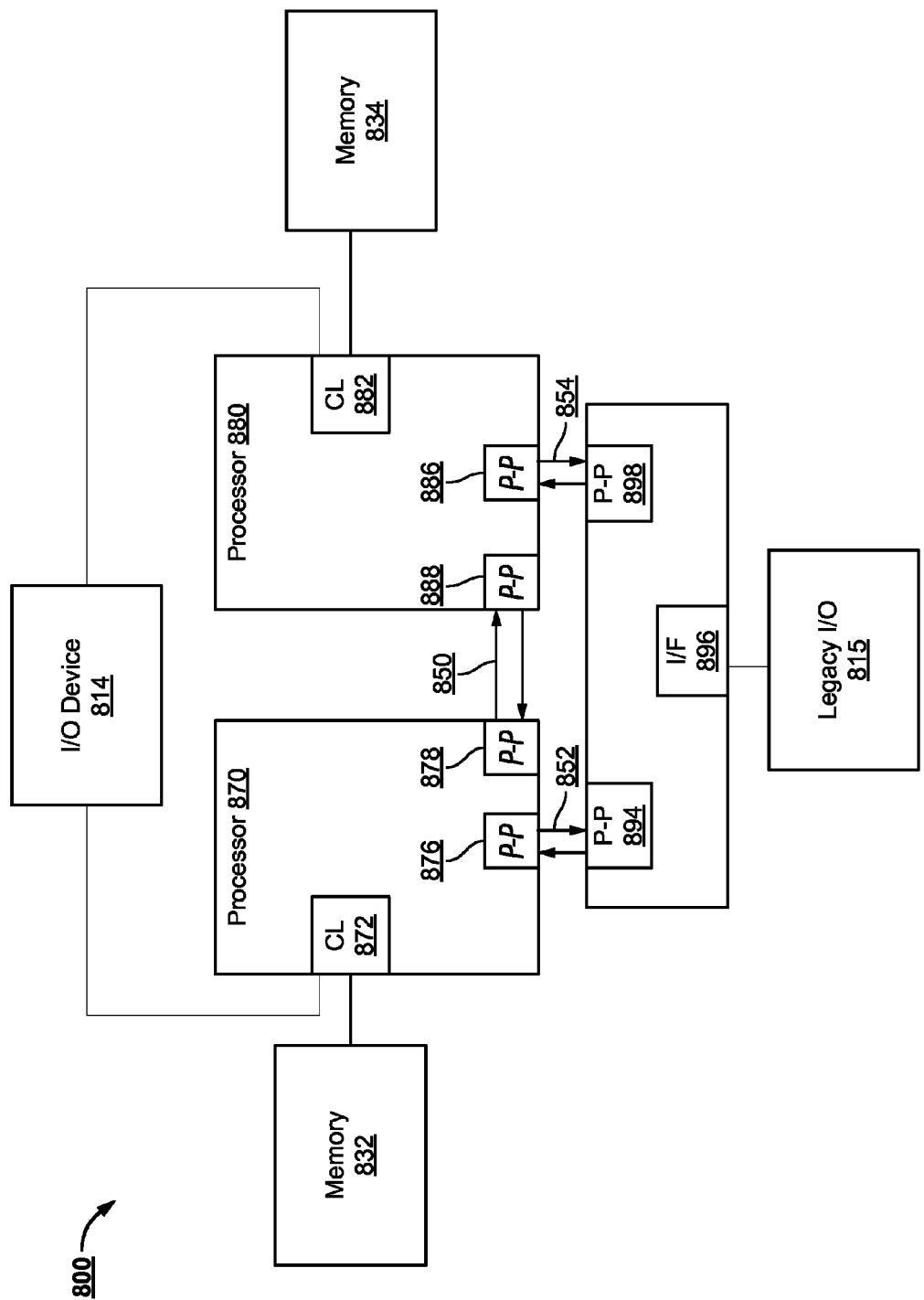
FIG. 8 is a block diagram of a system in which an embodiment of the disclosure may operate.

Referring now to FIG. 8, shown is a block diagram of a system 800 in which an embodiment of the disclosure may operate. FIG. 8 illustrates processors 870, 880. In one embodiment, processors 870, 880 may implement tracking elapsed cycle time in LBRs as described above. Processors 870, 880 may include integrated memory and I/O control logic ("CL") 872 and 882, respectively and intercommunicate with each other via point-to-point interconnect 850 between point-to-point (P-P) interfaces 878 and 888 respectively. Processors 870, 880 each communicate with chipset 890 via point-to-point interconnects 852 and 854 through the respective P-P interfaces 876 to 894 and 886 to 898 as shown. For at least one embodiment, the CL 872, 882 may include integrated memory controller units. CLs 872, 882 may include I/O control logic. As depicted, memories 832, 834 coupled to CLs 872, 882 and I/O devices 814 are also coupled to the control logic 872, 882. Legacy I/O devices 815 are coupled to the chipset 890 via interface 896.

Figure 9:
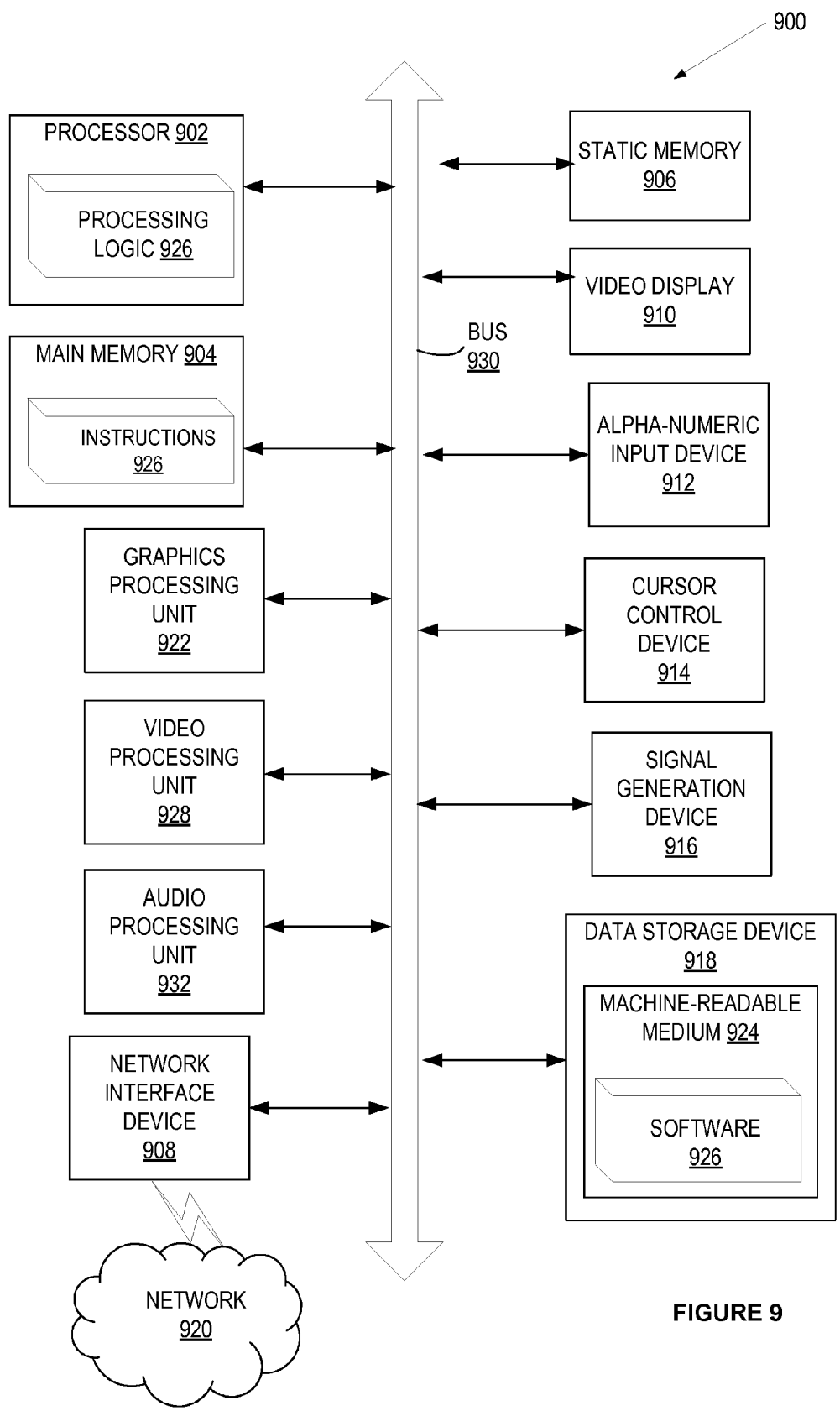
FIG. 9 illustrates a block diagram of one embodiment of a computer system.

FIG. 9 illustrates a diagrammatic representation of a machine in the example form of a computer system 900 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 900 includes a processing device 902, a main memory 904 (e.g., read-only memory (ROM), flash memory, dynamic random access memory (DRAM) (such as synchronous DRAM (SDRAM) or DRAM (RDRAM), etc.), a static memory 906 (e.g., flash memory, static random access memory (SRAM), etc.), and a data storage device 918, which communicate with each other via a bus 930.

Processing device 902 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. In one embodiment, processing device 902 may include one or processing cores. The processing device 902 is configured to execute the processing logic 926 for performing the operations and steps discussed herein. In one embodiment, processing device 902 is the same as processor architecture 100 described with respect to FIG. 1 that tracking elapsed cycle time in LBRs as described herein with embodiments of the disclosure.

The computer system 900 may further include a network interface device 908 communicably coupled to a network 920. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), and a signal generation device 916 (e.g., a speaker). Furthermore, computer system 900 may include a graphics processing unit 922, a video processing unit 928, and an audio processing unit 932.

The data storage device 918 may include a machine-accessible storage medium 924 on which is stored software 926 implementing any one or more of the methodologies of functions described herein, such as implementing an RS with restricted entries as described above. The software 926 may also reside, completely or at least partially, within the main memory 904 as instructions 926 and/or within the processing device 902 as processing logic 926 during execution thereof by the computer system 900; the main memory 904 and the processing device 902 also constituting machine-accessible storage media.

The machine-readable storage medium 924 may also be used to store instructions 926 implementing LBRs that track elapsed cycle time of between subsequent branch instructions such as described with respect to LBR 120 in FIG. 1, and/or a software library containing methods that call the above applications. While the machine-accessible storage medium 928 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present disclosure. The term "machine-accessible storage medium" shall accordingly be taken to include, but not be limited to, solid-state memories, and optical and magnetic media.

The following examples pertain to further embodiments. Example 1 is a processing device for device implementing an elapsed cycle timer in LBRs comprising a LBR counter to iterate with each cycle of the processing device and an LBR structure communicably coupled to the LBR counter and comprising a plurality of LBR entries. Further to Example 1, an LBR entry of the plurality of LBR entries comprises an address instruction pointer (IP) of a branch instruction executed by the processing device, an address IP of a target of the branch instruction, and an elapsed time field that stores a value of the LBR counter when the LBR entry is created.

In Example 2, the subject matter of Example 1 can optionally include wherein the LBR counter resets upon creation of each LBR entry. In Example 3, the subject matter of any one of Examples 1-2 can optionally include wherein the value of the LBR counter comprises a number of cycles of the processing device since addition of an immediately-previous LBR entry to the LBR entry, wherein the cycles comprise at least one of core clock cycles of the processing device or reference clock cycles of the processing device. In Example 4, the subject matter of any one of Examples 1-3 can optionally include wherein the LBR counter and the LBR structure are part of a retirement unit of the processing device.

In Example 5, the subject matter of any one of Examples 1-4 can optionally include wherein the LBR structure is an array data structure. In Example 6, the subject matter of any one of Examples 1-5 can optionally include wherein the elapsed time field is part of a last branch information portion of the LBR entry. In Example 7, the subject matter of any one of Examples 1-6 can optionally include wherein the LBR structure is comprised of a plurality of model-specific registers (MSRs).

In Example 8, the subject matter of any one of Examples 1-7 can optionally include wherein the address IP of the branch instruction and the address IP of the target of the branch instruction are obtained from address IP calculation components of the processing device. In Example 9, the subject matter of any one of Examples 1-8 can optionally include wherein the LBR counter is configured to increment at intervals of cycles to decrease a resolution of the LBR counter and increase a saturation threshold of the LBR counter. All optional features of the apparatus described above may also be implemented with respect to the method or process described herein.

Example 10 is a method for implementing an elapsed cycle timer in LBRs comprising recording, by a processing device in an entry of a last branch record (LBR) structure of the processing device, an address instruction pointer (IP) of a branch instruction executed by the processing device, recording, in the entry of the LBR structure, an address IP of a target of the branch instruction, sampling a value of a LBR counter, recording the value of the LBR counter in an elapsed time field of the entry of the LBR structure, and resetting the LBR counter In Example 11, the subject matter of Example 10 can optionally include further comprising receiving a signal indicating that the branch instruction is to be recorded in the LBR structure, and accessing the entry in the LBR structure to perform the recording the address IPs and the recoding the value of the LBR counter. In Example 12, the subject matter of any one of Examples 10-11 can optionally include wherein the LBR structure comprises a plurality of LBR entries and wherein the LBR counter resets upon creation of each LBR entry in the LBR structure.

In Example 13, the subject matter of any one of Examples 10-12 can optionally include wherein the value of the LBR counter comprises a number of cycles of the processing device since addition of an immediately-previous LBR entry to the LBR entry, wherein the cycles comprise at least one of core clock cycles of the processing device or reference clock cycles of the processing device. In Example 14, the subject matter of any one of Examples 10-13 can optionally include wherein the LBR counter and the LBR structure are part of a retirement unit of the processing device.

In Example 15, the subject matter of any one of Examples 10-14 can optionally include wherein the LBR structure is an array data structure. In Example 16, the subject matter of any one of Examples 10-15 can optionally include wherein the elapsed time field is part of a last branch information portion of the LBR entry. In Example 17, the subject matter of any one of Examples 10-16 can optionally include wherein the LBR structure is comprised of a plurality of model-specific registers (MSRs).

In Example 18, the subject matter of any one of Examples 10-17 can optionally include wherein the address IP of the branch instruction and the address IP of the target of the branch instruction are obtained from address IP calculation components of the processing device. In Example 19, the subject matter of any one of Examples 10-18 can optionally include wherein the LBR counter is configured to increment at intervals of cycles to decrease a resolution of the LBR counter and increase a saturation threshold of the LBR counter.

Example 20 is a system for implementing an elapsed cycle timer in LBRs. In Example 20, the system includes an execution unit to execute one or more branch instructions, and a retirement unit communicably coupled to the execution unit and comprising a last branch record (LBR) structure and an LBR counter. Further to Example 20, the retirement unit to record, in an entry of the LBR structure, an address instruction pointer (IP) of a branch instruction executed by the processing device, record, in the entry of the LBR structure, an address IP of a target of the branch instruction, sample a value of the LBR counter, record the value of the LBR counter in an elapsed time field of the entry of the LBR structure, and reset the LBR counter.

In Example 21, the subject matter of Example 20 can optionally include wherein the retirement unit further to send a signal to the LBR structure and the LBR counter indicating that the branch instruction is to be recorded in the LBR structure, and access the entry in the LBR structure to perform the recording the address IPs and the recoding the value. In Example 22, the subject matter of any one of Examples 20-21 can optionally include wherein the LBR structure comprises a plurality of LBR entries and wherein the LBR counter resets upon creation of each LBR entry in the LBR structure.

In Example 23, the subject matter of any one of Examples 20-22 can optionally include wherein the value of the LBR counter comprises a number of cycles of the processing device since addition of an immediately-previous LBR entry to the LBR entry, wherein the cycles comprise at least one of core clock cycles of the processing device or reference clock cycles of the processing device. In Example 24, the subject matter of any one of Examples 20-23 can optionally include wherein the LBR counter and the LBR structure are part of a retirement unit of the processing device.

In Example 25, the subject matter of any one of Examples 20-24 can optionally include wherein the LBR structure is an array data structure. In Example 26, the subject matter of any one of Examples 20-25 can optionally include wherein the elapsed time field is part of a last branch information portion of the LBR entry. In Example 27, the subject matter of any one of Examples 20-26 can optionally include wherein the LBR structure is comprised of a plurality of model-specific registers (MSRs).

In Example 28, the subject matter of any one of Examples 20-27 can optionally include wherein the address IP of the branch instruction and the address IP of the target of the branch instruction are obtained from address IP calculation components of the processing device. In Example 29, the subject matter of any one of Examples 20-28 can optionally include wherein the LBR counter is configured to increment at intervals of cycles to decrease a resolution of the LBR counter and increase a saturation threshold of the LBR counter. All optional features of the system described above may also be implemented with respect to the method or process described herein.

Example 30 is a non-transitory computer-readable medium for implementing an elapsed cycle timer in LBRs. In Example 30, the non-transitory machine-readable medium includes data that, when accessed by a processing device, cause the processing device to perform operations comprising recording, by a processing device in an entry of a last branch record (LBR) structure of the processing device, an address instruction pointer (IP) of a branch instruction executed by the processing device, recording, in the entry of the LBR structure, an address IP of a target of the branch instruction, sampling a value of an LBR counter, recording the sampled value of the LBR counter in an elapsed time field of the entry of the LBR structure, and resetting the LBR counter.

In Example 31, the subject matter of Example 30 can optionally include wherein the operations further comprise receiving a signal indicating that the branch instruction is to be recorded in the LBR structure, and accessing the entry in the LBR structure to perform the recording the address IPs and the recoding the value. In Example 32, the subject matter of Examples 30-31 can optionally include wherein the LBR structure comprises a plurality of LBR entries and wherein the LBR counter resets upon generation of each LBR entry in the LBR structure.

In Example 33, the subject matter of Examples 30-32 can optionally include wherein the value of the LBR counter comprises a number of cycles of the processing device since addition of an immediately-previous LBR entry to the LBR entry, wherein the cycles comprise at least one of core clock cycles of the processing device or reference clock cycles of the processing device. In Example 34, the subject matter of Examples 30-33 can optionally include wherein the LBR counter and the LBR structure are part of a retirement unit of the processing device.

In Example 35, the subject matter of Examples 30-34 can optionally include wherein the LBR structure is an array data structure. In Example 36, the subject matter of Examples 30-35 can optionally include wherein the elapsed time field is part of a last branch information portion of the LBR entry. In Example 37, the subject matter of Examples 30-36 can optionally include wherein the LBR structure is comprised of a plurality of model-specific registers (MSRs).

In Example 38, the subject matter of Examples 30-37 can optionally include wherein the address IP of the branch instruction and the address IP of the target of the branch instruction are obtained from address IP calculation components of the processing device. In Example 39, the subject matter of Examples 30-38 can optionally include wherein the LBR counter is configured to increment at intervals of cycles to decrease a resolution of the LBR counter and increase a saturation threshold of the LBR counter.

Example 40 is an apparatus for implementing an elapsed cycle timer in LBRs comprising means for recording, in an entry of a last branch record (LBR) structure of a processing device, an address instruction pointer (IP) of a branch instruction executed by the processing device, means for recording, in the entry of the LBR structure, an address IP of a target of the branch instruction, means for sampling a value of an LBR counter, means for recording the sampled value of the LBR counter in an elapsed time field of the entry of the LBR structure, and means for resetting the LBR counter. In Example 41, the subject matter of Example 40 can optionally include the apparatus further configured to perform the method of any one of the Examples 11 to 19.

Example 42 is at least one machine readable medium comprising a plurality of instructions that in response to being executed on a computing device, cause the computing device to carry out a method according to any one of Examples 10-19. Example 43 is an apparatus for implementing a cycle timer to track elapsed cycle time in LBRs, configured to perform the method of any one of Examples 10-19. Example 44 is an apparatus for implementing a cycle time to track elapsed cycle time in LBRs comprising means for performing the method of any one of claims 10 to 19. Specifics in the Examples may be used anywhere in one or more embodiments.

While the disclosure has been described with respect to a limited number of embodiments, those skilled in the art will appreciate numerous modifications and variations there from. It is intended that the appended claims cover all such modifications and variations as fall within the true spirit and scope of this disclosure.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 910 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A processing device, comprising:
a last branch record (LBR) counter to iterate with each cycle of the processing device; and
an LBR structure communicably coupled to the LBR counter and comprising a plurality of LBR entries, wherein the LBR counter and the LBR structure are part of a retirement unit of the processing device, and wherein an LBR entry of the plurality of LBR entries comprises:
an address instruction pointer (IP) of a branch instruction executed by the processing device;
an address IP of a target of the branch instruction; and
an elapsed time field that stores a value of the LBR counter when the LBR entry is created.

2. The processing device of claim 1, wherein the LBR counter resets upon creation of each LBR entry.

3. The processing device of claim 1, wherein the value of the LBR counter comprises a number of cycles of the processing device since addition of an immediately-previous LBR entry to the LBR entry, wherein the cycles comprise at least one of core clock cycles of the processing device or reference clock cycles of the processing device.

4. The processing device of claim 1, wherein the LBR structure is an array data structure.

5. The processing device of claim 1, wherein the elapsed time field is part of a last branch information portion of the LBR entry.

6. The processing device of claim 1, wherein the LBR structure is comprised of a plurality of model-specific registers (MSRs).

7. The processing device of claim 1, wherein the address IP of the branch instruction and the address IP of the target of the branch instruction are obtained from address IP calculation components of the processing device.

8. The processing device of claim 1, wherein the LBR counter is to increment at intervals of cycles to decrease a resolution of the LBR counter and increase a saturation threshold of the LBR counter.

9. A method, comprising:
recording, by a processing device in an entry of a last branch record (LBR) structure of the processing device, an address instruction pointer (IP) of a branch instruction executed by the processing device, wherein the LBR counter and the LBR structure are part of a retirement unit of the processing device;

recording, in the entry of the LBR structure, an address IP of a target of the branch instruction;

sampling a value of a LBR counter;

recording the value of the LBR counter in an elapsed time field of the entry of the LBR structure; and resetting the LBR counter.

10. The method of claim 9, further comprising:

receiving a signal indicating that the branch instruction is to be recorded in the LBR structure; and accessing the entry in the LBR structure to perform the recording the address IPs and the recoding the value of the LBR counter.

11. The method of claim 9, wherein the LBR structure comprises a plurality of LBR entries and wherein the LBR counter resets upon creation of each LBR entry in the LBR structure.

12. The method of claim 9, wherein the value of the LBR counter comprises a number of cycles of the processing device since addition of an immediately-previous LBR entry to the LBR entry, wherein the cycles comprise at least one of core clock cycles of the processing device or reference clock cycles of the processing device.

13. The method of claim 9, wherein the elapsed time field is part of a last branch information portion of the LBR entry.

14. The method of claim 9, wherein the LBR counter is to increment at intervals of cycles to decrease a resolution of the LBR counter and increase a saturation threshold of the LBR counter.

15. An system comprising:

an execution unit of a processing device to execute one or more branch instructions; and a retirement unit of the processing device communicably coupled to the execution unit and comprising a last branch record (LBR) structure and an LBR counter, the retirement unit to:

record, in an entry of the LBR structure, an address instruction pointer (IP) of a branch instruction executed by the processing device;

record, in the entry of the LBR structure, an address IP of a target of the branch instruction;

sample a value of the LBR counter;

record the value of the LBR counter in an elapsed time field of the entry of the LBR structure; and reset the LBR counter.

16. The system of claim 15, wherein the retirement unit further to:

send a signal to the LBR structure and the LBR counter indicating that the branch instruction is to be recorded in the LBR structure; and access the entry in the LBR structure to perform the recording the address IPs and the recoding the value.

17. The system of claim 15, wherein the LBR structure comprises a plurality of LBR entries and wherein the LBR counter resets upon creation of each LBR entry in the LBR structure.

18. The system of claim 15, wherein the value of the LBR counter comprises a number of cycles of the processing device since addition of an immediately-previous LBR entry to the LBR entry, wherein the cycles comprise at least one of core clock cycles of the processing device or reference clock cycles of the processing device.

19. The system of claim 15, wherein the LBR structure is comprised of a plurality of model-specific registers (MSRs).

20. The system of claim 15, wherein the address IP of the branch instruction and the address IP of the target of the branch instruction are obtained from address IP calculation components of the processing device.

21. The system of claim 15, wherein the LBR counter is to increment at intervals of cycles to decrease a resolution of the LBR counter and increase a saturation threshold of the LBR counter.

* * * * *